United States Patent
Hsieh

(10) Patent No.: US 9,000,077 B2
(45) Date of Patent: Apr. 7, 2015

(54) PHOSPHAZENE COMPOUND HAVING VINYL GROUP, RESIN COMPOSITION CONTAINING THE SAME, AND CIRCUIT BOARD MANUFACTURED FROM THE SAME

(71) Applicant: Elite Material Co., Ltd., Tao-Yuan Hsien (TW)

(72) Inventor: Chen-Yu Hsieh, Taoyuan County (TW)

(73) Assignee: Elite Material Co., Ltd., Tao-Yuan Hsien (TW)

( * ) Notice: Subject to any disclaimer, the term of this patent is extended or adjusted under 35 U.S.C. 154(b) by 0 days.

(21) Appl. No.: 13/921,447

(22) Filed: Jun. 19, 2013

(65) Prior Publication Data
US 2014/0323624 A1   Oct. 30, 2014

(30) Foreign Application Priority Data

Apr. 30, 2013 (TW) .............................. 102115491 A

(51) Int. Cl.
| | |
|---|---|
| C08L 71/12 | (2006.01) |
| C08L 79/00 | (2006.01) |
| C08G 79/02 | (2006.01) |
| C08L 85/02 | (2006.01) |
| B32B 15/20 | (2006.01) |
| B32B 27/28 | (2006.01) |
| C08L 79/04 | (2006.01) |

(52) U.S. Cl.
CPC ............... *C08L 79/00* (2013.01); *C08G 79/025* (2013.01); *C08L 85/02* (2013.01); *B32B 15/20* (2013.01); *B32B 27/28* (2013.01); *C08L 79/04* (2013.01)

(58) Field of Classification Search
CPC ...... C08K 5/5399; C08L 71/123; C08L 79/00
USPC ............... 524/138, 122, 148; 55/76, 157, 200
See application file for complete search history.

(56) References Cited

U.S. PATENT DOCUMENTS 4,874,828 A * 10/1989 Lukacs, III .................... 526/262
2003/0166812 A1 * 9/2003 Taniguchi et al. ............ 526/274

FOREIGN PATENT DOCUMENTS

| EP | 2 752 449 | * 7/2014 |
|---|---|---|
| JP | 2003-302751 | * 10/2003 |
| TW | 322507 | 12/1997 |
| TW | I238846 | 9/2005 |
| WO | WO 2013/029271 | * 3/2013 |

* cited by examiner

*Primary Examiner* — Randy Gulakowski
*Assistant Examiner* — Christopher M Rodd
(74) *Attorney, Agent, or Firm* — WPAT, P.C.; Anthony King; Kay Yang

(57) ABSTRACT

A phosphazene compound having a vinyl group is manufactured by a reaction between a vinyl compound and a phosphazene compound having a hydroxyl group and added to a resin composition for manufacturing a prepreg or a resin film so as to be applicable to copper-clad laminates and printed circuit boards to thereby achieve satisfactory circuit laminate properties, namely low coefficient of thermal expansion, low dielectric properties, heat resistant, fire resistant, and halogen-free.

10 Claims, 3 Drawing Sheets

PHOSPHAZENE COMPOUND HAVING VINYL GROUP, RESIN COMPOSITION CONTAINING THE SAME, AND CIRCUIT BOARD MANUFACTURED FROM THE SAME

CROSS-REFERENCE TO RELATED APPLICATION

This non-provisional application claims priority under 35 U.S.C. §119(a) on Patent Application No(s). 102115491 filed in Taiwan, R.O.C. on Apr. 30, 2013, the entire contents of which are hereby incorporated by reference.

FIELD OF THE INVENTION

The present invention relates to a phosphazene compound having a vinyl group, a method for manufacturing the same, and more particularly, to a phosphazene compound having a vinyl group applicable to copper-clad laminates (CCL) and printed circuit boards.

BACKGROUND OF THE INVENTION

To get in line with the global trend of environmental protection and eco-friendly regulations, electronic product manufacturers nowadays are developing and manufacturing halogen-free electronic products. Advanced countries and electronic manufacturing giants set forth schedules of launching mass production of halogen-free electronic products. As a result of the promulgation of the Restriction of Hazardous Substances (RoHS) by the European Union, hazardous substances, such as lead, cadmium, mercury, hexavalent chromium, poly-brominated biphenyl (PBB), and poly-brominated diphenyl ether (PBDE), are strictly prohibited from being used in manufacturing electronic products or their parts and components. A printed circuit board (PCB) is an indispensable and fundamental basis of the semiconductor industry and electronic industry; hence, printed circuit boards bore the brunt of international halogen-free regulations when international organizations set forth strict requirements of the halogen content of printed circuit boards. For example, the International Electrotechnical Commission (IEC) 61249-2-21 requires that bromine content and chloride content shall be less than 900 ppm and the total halogen content shall be less than 1500 ppm. The Japan Electronics Packaging and Circuits Association (JPCA) requires that both bromide content and chloride content shall be less than 900 ppm. To enforce its green policies, Greenpeace calls on manufacturers worldwide to get rid of polyvinyl chloride (PVC) and brominated flame retardants (BFRs) from their electronic products in order to conform with the lead-free and halogen-free requirements of green electronics. Hence, the industrial sector nowadays is interested in rendering related materials halogen-free and sees this technique as one of its key research topics.

Electronic products nowadays have the trend toward compactness and high-frequency transmission; hence, circuit boards nowadays typically feature a high-density layout and increasingly strict material requirements. To mount high-frequency electronic components on a circuit board, it is necessary that the laminate of the circuit board is made of a material of a low dielectric constant (Dk) and dielectric dissipation factor (Df) in order to maintain the transmission speed and the integrity of a signal transmitted. To allow the electronic components to function well at a high temperature and a high-humidity environment, it is necessary for the circuit board to be heat resistant, fire resistant, and of low hygroscopicity. Epoxy resin is adhesive, heat resistant, and malleable and thus is widely applicable to encapsulants and copper clad laminates (CCL) of electronic components and machinery. From the perspective of fire prevention, epoxy resin is incapable of flame retardation, and thus epoxy resin has to acquire flame retardation capability by including a flame retardant therein. For example, a halogen, such as bromine, is included in epoxy resin to not only bring about flame retardation capability thereof but also enhance epoxy reactivity. Furthermore, after long use, halides are likely to decompose at high temperature, which often results in corrosion of fine circuits. Also, upon their combustion, discarded electronic parts and components produce halides which are most hazardous and environmentally unfriendly. To find an alternative to the aforesaid halide-based flame retardant, researchers attempt to use a phosphorous compound as a flame retardant, for example, adding phosphate ester (Taiwan patent 1238846) or red phosphorus (Taiwan patent 322507) to an epoxy resin composition. However, phosphate ester undergoes hydrolysis readily to produce an acid, thereby compromising its tolerance to migration. Although red phosphorus is good at flame retardation, it falls into the category of hazardous compounds under the firefighting law, because it produces a trace of a flammable, toxic gas known as phosphine in a warm humid environment.

At present, to enable environment-friendly halogen-free resin compositions to attain UL94 V-0 flame retardation, it is usually necessary to add thereto a phosphorus-containing flame retardant. The phosphorus-containing flame retardant preferably contains a phosphazene compound (Phosphazene). However, a conventional phosphazene compound (such as SPB-100 manufactured by Otsuka Chemical Co., Ltd. (hereinafter "Otsuka Chemical")) lacks a reactive functional group, and, as a result, the conventional phosphazene compound contained in a halogen-free resin composition cannot react with any other resin. As a result, a laminate manufactured from the halogen-free resin composition has an overly large coefficient of thermal expansion, thereby causing a circuit board manufactured from the laminate to crack internally during a manufacturing process and reducing the yield. In view of this, phosphazene compound suppliers further developed a phosphazene compound having a hydroxyl group (such as SPH-100 manufactured from Otsuka Chemical). Due to its hydroxyl group, SPH-100 reacts with any other resin readily. However, SPH-100 has a disadvantage, that is, its hydroxyl group results in overly high dielectric constant Dk and overly high dielectric dissipation factor Df. Hence, a phosphazene compound having a hydroxyl group is not suitable for use in low-dielectric resin compositions.

The major considerations given to electrical properties include the dielectric constant (Dk) and the dielectric dissipation factor. In general, the signal transmission speed of a laminate is inversely proportional to the square root of the dielectric constant (Dk) of the material from which the laminate is made, and thus the minimization of the dielectric constant (Dk) of the laminate material is usually advantageously important. The lower the dielectric dissipation factor is, the lesser the signal transmission attenuation is; hence, a material of a low dielectric dissipation factor provides satisfactory transmission quality.

Accordingly, it is important for printed circuit board material suppliers to develop materials of a low dielectric constant (Dk) and a low dielectric dissipation factor (Df), and apply the materials to high-frequency printed circuit board manufacturing.

SUMMARY OF THE INVENTION

In view of the aforesaid drawbacks of the prior art, the inventor of the present invention conceived room for improvement in the prior art and thus conducted extensive researches and experiments according to the inventor's years of experience in the related industry, and finally developed a phosphazene compound having a vinyl group, and a method for manufacturing the same, as disclosed in the present invention.

It is an objective of the present invention to provide a phosphazene compound having a vinyl group, which can be included in a resin composition for manufacturing a prepreg (PP) or a resin film to thereby be applicable to copper-clad laminates (CCL) and printed circuit boards, thereby achieving satisfactory circuit laminate properties, namely a low coefficient of thermal expansion, low dielectric properties, heat resistant, fire resistant, and halogen-free.

In order to achieve the above and other objectives, the present invention provides a phosphazene compound having a vinyl group, the phosphazene compound being of a structure expressed by formula (I) below:

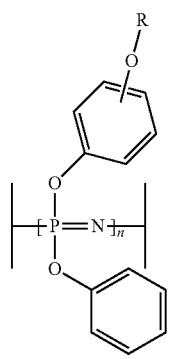

formula (I)

wherein R is one of a C1 to C20 straight-chain alkyl group, a C1 to C20 cycloalkyl group, a C1 to C20 benzyl group, and a C1 to C20 aromatic group, each being substituted by a vinyl group, wherein n denotes an integer from 1 to 6.

Alternatively, the aforesaid phosphazene compound is of a structure expressed by formula (II) below:

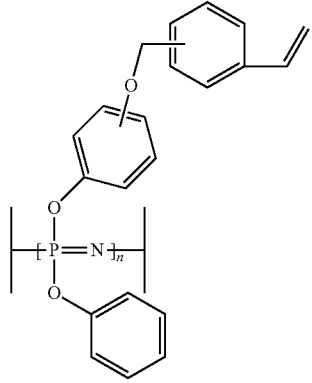

formula (II)

wherein n denotes an integer from 1 to 6.

Alternatively, the aforesaid phosphazene compound is of a structure expressed by formula (III) below:

formula (III)

Another objective of the present invention is to provide a method for manufacturing a phosphazene compound having a vinyl group, so as to manufacture the phosphazene compound having a vinyl group by a reaction between a vinyl compound and a phosphazene compound having a hydroxyl group.

As regards the method, the vinyl compound is one of 4-chloro-methyl styrene, 3-chloro-methyl styrene, and 2-chloro-methyl styrene, or a combination thereof.

As regards the method, the reaction preferably takes place in the presence of sodium hydroxide and tetrabutylammonium iodide, but the reaction of the present invention is not limited thereto.

The method for manufacturing the phosphazene compound having a vinyl group according to the present invention preferably entails allowing a phosphazene compound having a hydroxyl group to react with a 4-chloro-methyl styrene in a toluene solvent to thereby produce the phosphazene compound having a vinyl group (also known as the phosphazene compound having ether with a vinylbenzyl group or a phosphorus-nitrogen compound having ether with a vinylbenzyl group), as expressed by formula (II) and formula (III), respectively. In this regard, the phosphazene compound having ether with a vinylbenzyl group is a phosphazene compound having a vinyl group, and is preferably produced by a reaction which takes place in the presence of two compounds, namely sodium hydroxide and tetrabutylammonium iodide. Furthermore, the method for manufacturing the phosphazene compound having a vinyl group according to the present invention preferably entails, after the reaction, rinsing the phosphazene compound with methanol to remove impurities therefrom. For example, a sodium halide (such as sodium chloride), which results from a halogen-containing substance contained in a reactant undergoing a reaction, can be removed by means of methanol, such that the phosphazene compound having a vinyl group, as disclosed in the present invention, can function as a halogen-free flame retarding compound.

Unlike conventional phosphazene compounds, the phosphazene compound having a vinyl group according to the present invention has advantages as follows:

Thanks to the vinyl group, the phosphazene compound of the present invention can react with any other compound having a vinyl group by means of a peroxide. Conventional phosphazene compounds lack any reactive functional groups and thus cannot react with any other resin.

The phosphazene compound having a vinyl group according to the present invention surpasses phosphazene compounds having a hydroxyl group in dielectric properties.

Unlike conventional phosphazene compounds included in a resin composition, the phosphazene compound having a vinyl group according to the present invention features a low coefficient of thermal expansion.

Yet another objective of the present invention is to provide a resin composition which comprises the phosphazene compound having a vinyl group.

The resin composition further comprises one of epoxy resin, phenol resin, isocyanate ester resin, cyanate ester resin, benzoxazine resin, styrene-maleic anhydride (SMA), polyester, maleimide, polyphenylene ether resin, dicyandiamide, diaminodiphenylsulfone, styrene, polybutadiene, polyamide, polyimide, olefin, a curing accelerator, an inorganic filler, a solvent, a toughening agent, and a silane coupling agent, a modified derivative thereof, or a combination thereof.

There is not any specific limitation to the cyanate ester resin included in the resin composition of the present invention; hence, the resin composition of the present invention can contain any conventional cyanate ester resin, for example, any compound having Ar—O—C≡N, where Ar denotes a substituted or unsubstituted benzene, biphenyl, naphthalene, phenol novolac, bisphenol A, bisphenol A novolac, bisphenol F, bisphenol F novolac, or phenolphthalein. Furthermore, the Ar is further bonded with a substituted or unsubstituted dicyclopentadienyl (DCPD).

In an embodiment of the present invention, the cyanate ester resin is preferably one of the following:

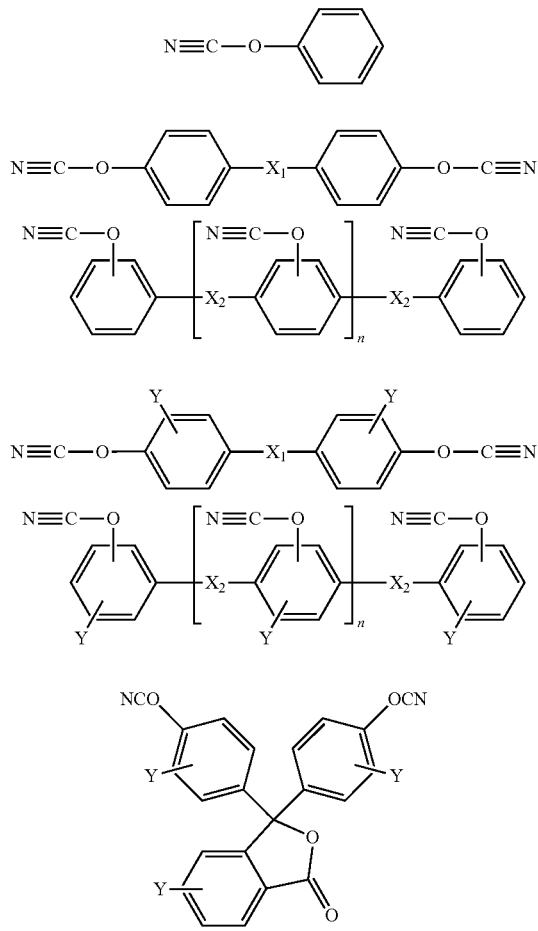

where $X_1$, $X_2$ are independent of each other and denote at least one R, Ar', $SO_2$ or O; R is one of —C(CH$_3$)$_2$—, —CH(CH$_3$)—, —CH$_2$— and comprises a functional group of DCPD; Ar' is a functional group derived from one of benzene, biphenyl, naphthalene, phenol novolac, bisphenol A, triazole, hydrogenated bisphenol A, bisphenol A novolac, bisphenol F, and bisphenol F novolac; n denotes an integer larger than or equal to 1; and Y denotes an aliphatic functional group or an aromatic functional group.

The aforesaid aliphatic functional group is a C1-C30 alkane, alkene, alkyne, cyclic alkane, cyclic alkene, or a derivative thereof. The aforesaid aromatic functional group is a C1-C14 compound having a benzene ring, such as benzene, naphthalene, anthracene, or a derivative thereof.

Examples of the cyanate ester resin added to the resin composition of the present invention include, but are not limited to, Primaset PT-15, PT-30S, PT-60S, CT-90, BADCY, BA-100-10T, BA-200, BA-230S, BA-300S, BTP-2500, BTP-6020S, DT-4000, DT-7000, Methylcy, ME-240S, which are manufactured by Lonza, and a combination thereof.

The styrene-maleic anhydride (SMA) copolymer included in the resin composition of the present invention preferably comprises a monomer unit expressed by formula (a) as follows:

(a)

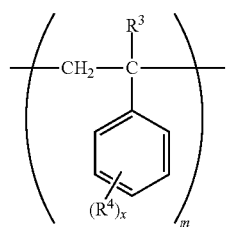

where $R^3$ is a hydrogen atom, a halogen atom, or a C1 to C5 alkyl group, and each $R^4$ is a halogen atom, a C1 to C5 aliphatic alkyl group, or an aromatic alkyl group, where x denotes an integer from 0 to 3, preferably 0, and m denotes a natural number; and the monomer unit is expressed by formula (b) as follows:

(b)

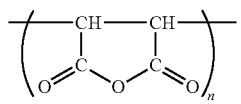

where n denotes a natural number.

A styrene (S) to maleic anhydride (MA) ratio of the styrene-maleic anhydride (SMA) copolymer in the resin composition of the present invention is 1/1, 2/1, 3/1, 4/1, 6/1, or 8/1. Examples of the styrene-maleic anhydride (SMA) copolymer include, but are not limited to, SMA-1000, SMA-2000, SMA-3000, EF-30, EF-40, EF-60 and EF-80, which are manufactured by Cray Valley. Furthermore, the styrene-maleic anhydride (SMA) copolymer can also be esterified styrene-maleic anhydride (SMA) copolymer, including an esterified styrene-maleic anhydride (SMA) copolymer of SMA1440, SMA17352, SMA2625, SMA3840 and SMA31890, which are manufactured by Cray Valley. One, or a combination, of the above-mentioned applies to the styrene-maleic anhydride (SMA) copolymer added to the resin composition of the present invention.

The polyphenylene ether resin in the resin composition of the present invention is preferably one of polyphenylene ether resin with hydroxyl terminated group (such as SA-90, purchased from Sabic), polyphenylene ether resin with vinyl terminated group or allyl terminated group (such as SA-9000, purchased from Sabic), and polyphenylene ether resin with vinyl benzyl ether terminated group (such as OPE-2st, purchased from Mitsubishi Gas Chemical Co., Ltd.)

The maleimide resin included in the resin composition of the present invention is preferably at least one of 4,4'-diphenylmethane bismaleimide, oligomer of phenylmethane maleimide, m-phenylenebismaleimide, bisphenol A diphenyl ether bismaleimide, 3,3'-dimethyl-5,5'-diethyl-4,4'-diphenylmethane bismaleimide, 4-methyl-1,3-phenylene bismaleimide, and 1,6-bismaleimide-(2,2,4-trimethyl) hexane.

The resin composition of the present invention selectively includes one or more curing accelerators to speed up the curing of resin. In this regard, whatever curing accelerators which speed up the curing of the resin composition of the present invention are applicable to the present invention. Preferably, a curing accelerator of the present invention comprises a peroxide curing accelerator that generates free radicals, including, but not limited to dicumyl peroxide, tert-butyl peroxybenzoate, and di(tert-butylperoxyisopropyl)benzene (BIPB). In an embodiment of the present invention, the curing accelerator applicable to the resin composition of the present invention is preferably BIPB.

The halogen-free resin composition of the present invention further includes 10 to 200 parts by weight of an inorganic filler whose purpose is to increase the thermal conductivity, enhance thermal expansion, and enhance mechanical strength of the resin composition of the present invention. The inorganic filler is preferably distributed in the resin composition of the present invention uniformly.

The inorganic filler comprises silicon dioxide (existing in a fused state or a non-fused state, or featuring a porous structure or a hollow-core structure), aluminum oxide, aluminum hydroxide, magnesium oxide, magnesium hydroxide, calcium carbonate, aluminum nitride, boron nitride, aluminum silicon carbide, silicon carbide, sodium carbonate, titanium dioxide, zinc oxide, zirconium oxide, quartz, diamond powder, quasi diamond powder, graphite, magnesium carbonate, potassium titanate, ceramic fiber, mica, boehmite (AlOOH), zinc molybdate, ammonium molybdate, zinc borate, calcium phosphate, calcinated talc, talc, silicon nitride, mullite, calcinated kaolinite, clay, alkaline magnesium sulfate whisker, mullite whisker, barium sulfate, magnesium hydroxide whisker, magnesium oxide whisker, calcium oxide whisker, carbon nanotube, nanoscale silicon dioxide, related inorganic powder, or powder particles having an organic nucleus and a insulating coating. The inorganic filler is spherical, fiber-like, plate-like, particle-like, sheet-like, or needle-shaped, and is selectively pretreated with a silane coupling agent.

A further objective of the present invention is to provide a prepreg (PP) which features a low coefficient of thermal expansion (CTE, Z-axis), a low dielectric constant, and a low dielectric dissipation factor, and is heat resistant, fire resistant, and halogen-free. To this end, the prepreg disclosed in the present invention comprises a reinforcing material and the resin composition, wherein the resin composition is attached to the reinforcing material and heated up at a high temperature to become semi-cured. The reinforcing material is a fibrous material, a woven fabric, or a non-woven fabric, such as a glass fiber fabric, and is intended to increase the mechanical strength of the prepreg. Also, the reinforcing material can be selectively pretreated with a silane coupling agent.

When heated up at a high temperature or heated up at a high temperature and a high pressure, the prepreg can be cured to form a cured prepreg or a solid-state insulating layer, wherein, if the resin composition contains a solvent, the solvent will evaporate and escape during a high-temperature heating process.

A further objective of the present invention is to provide a resin film which features a low coefficient of thermal expansion (CTE, Z-axis), a low dielectric constant, and a low dielectric dissipation factor, and is heat resistant, fire resistant, and halogen-free. The resin film comprises the resin composition. The resin film is applied to a PET film (polyester film) or a PI film (polyimide film). Alternatively, the resin film is applied to a resin coated copper (RCC) and then heated by baking.

A further objective of the present invention is to provide a laminate, such as a copper-clad laminate, which features a low coefficient of thermal expansion, and low dielectric properties, is heat resistant, fire resistant, and halogen-free, and is especially applicable to a circuit board for use in high-speed high-frequency signal transmission. To this end, the present invention provides a laminate which comprises two or more metal foils and at least one insulating layer. The metal foils are copper foils, for example, and further comprise an alloy of at least one of aluminum, nickel, platinum, silver, and gold. The insulating layer is formed by curing the aforesaid prepreg or resin film at high temperature and high pressure, for example, putting the aforesaid prepreg between the two metal foils and laminating them against each other at high temperature and high pressure.

The laminate of the present invention at least has the advantages described as follows: a low coefficient of thermal expansion, a low dielectric constant, a low dielectric dissipation factor, heat resistant, fire resistant, halogen-free, and environmentally friendly. The laminate further undergoes a circuit fabrication process to form a circuit board. After electronic components have been mounted on the circuit board, the circuit board operates well even at adverse environments, such as high temperature and high humidity.

A further objective of the present invention is to provide a printed circuit board which features a low coefficient of thermal expansion, and low dielectric properties, is heat resistant, fire resistant and halogen-free, and applicable to high-speed high-frequency signal transmission. To this end, the circuit board comprises at least the aforesaid laminate, and is manufactured by a conventional manufacturing process.

The embodiments below further disclose and describe the present invention so as to enable persons skilled in the art to implement the present invention accordingly. The embodiments below are illustrative, rather than restrictive, of the present invention. All equivalent modifications and changes made to the embodiments below by persons skilled in the art without departing from the spirit embodied in the present invention shall fall within the scope of the present invention.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

Manufacturing Example 1

Put 260 g of the phosphazene compound (Compound A, SPH-100) having a hydroxyl group, 150 g of 4-chlro-methyl styrene (CMS-P), and toluene in a reactor. Set the temperature in the reactor to 50~80□. Start blending the aforesaid chemicals in the reactor. In the course of the blending process, the solid-state phosphazene compound having a hydroxyl group dissolves and thus changes to a liquid state. Then, add 40 g of sodium hydroxide and 1 g of tetrabutylammonium iodide to the reactor and keep blending the chemical therein for 6 hours. Afterward, rinse the chemicals in the reactor with methanol to thereby obtain a phosphazene compound having ether with a vinylbenzyl group (Compound B). The phosphazene compound having ether with a vinylbenzyl group falls into the category of a phosphazene compound having a vinyl group according to the present invention, and it appears in the form of a brown solution (phosphazene compound having ether with a vinylbenzyl group and toluene) of 150 g.

Figure 1:
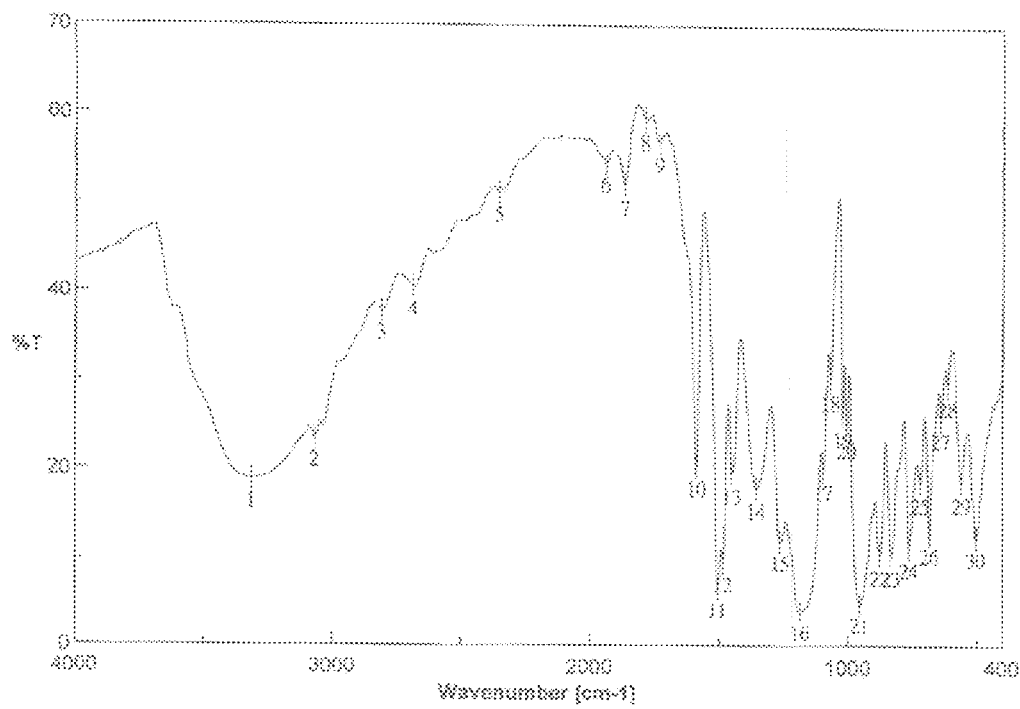
FIG. 1 shows a FTIR spectrum of a phosphazene compound (Compound A) having a hydroxyl group according to the present invention.
Figure 2:
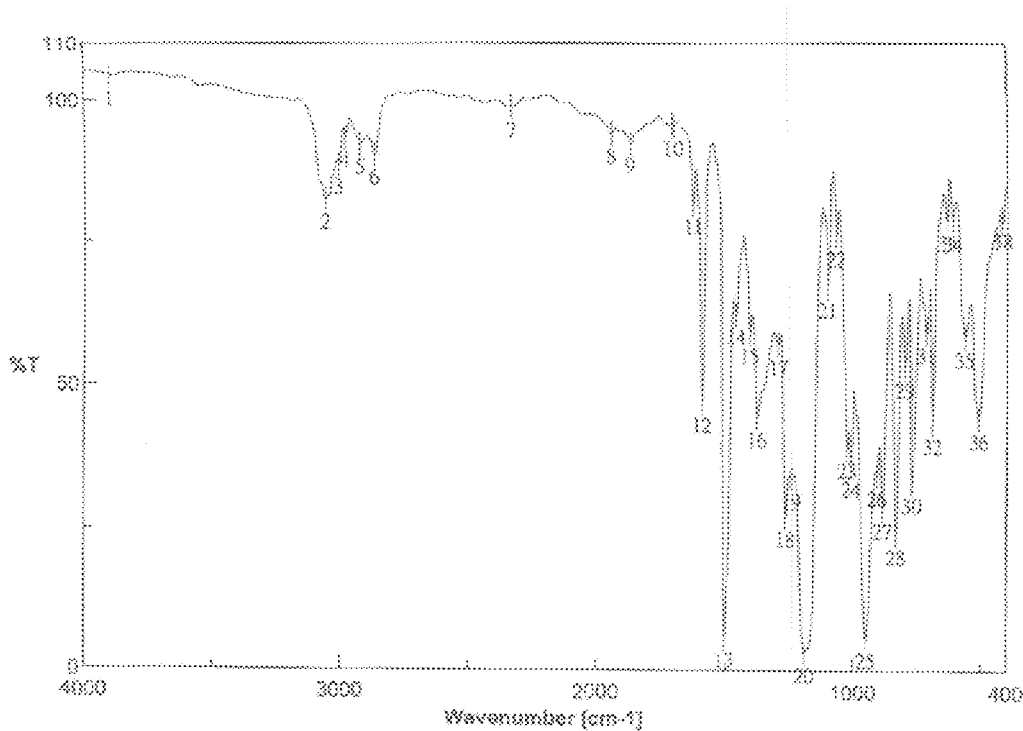
FIG. 2 shows a FTIR spectrum of a phosphazene compound (Compound B) having a vinyl group according to the present invention.
Figure 3:
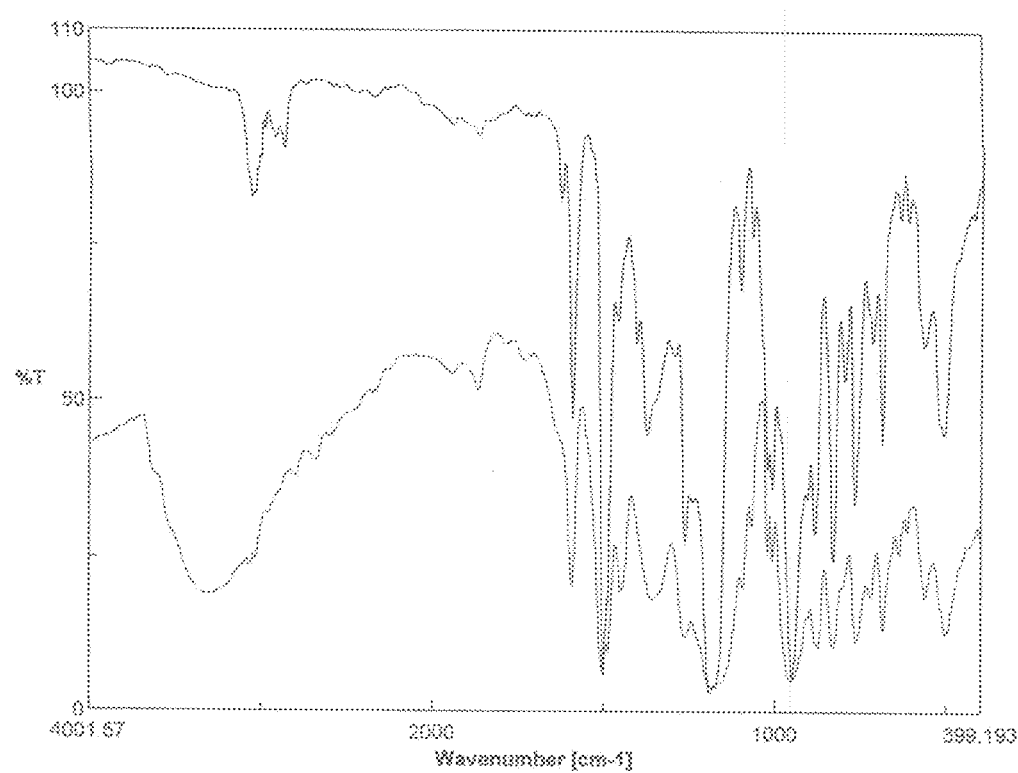
FIG. 3 is a diagram of comparison of the FTIR spectra of the phosphazene compound (Compound A) having a hydroxyl group and the phosphazene compound (Compound B) having a vinyl group.

The method for testing the aforesaid phosphazene compound having a vinyl group involves the use of FTIR, as shown in FIG. 1, FIG. 2 and FIG. 3. FIG. 1 shows a FTIR spectrum of a phosphazene compound (Compound A) having a hydroxyl group according to the present invention, wherein a peak indicative of a hydroxyl group (OH functional group) is displayed at 3300~3350 $cm^{-1}$ of the FTIR spectrum. FIG. 2 shows a FTIR spectrum of a phosphazene compound (Compound B) having a vinyl group according to the present invention, revealing the absence of any peak indicative of a hydroxyl group (OH functional group) at 3300~3350 $cm^{-1}$ of the FTIR spectrum, but revealing a peak indicative of a vinyl functional group (carbon-carbon double bond) at 1600~1700 $cm^{-1}$ of the FTIR spectrum, thereby proving the presence of the phosphazene compound having a vinyl group of the present invention.

Afterward, the phosphazene compound having a vinyl group, as synthesized in manufacturing example 1, is included in the resin composition in embodiments 1 through 3, and then the resultant resin composition in embodiments 1 through 3 is compared with the resin composition in comparisons 1 through 4.

Embodiment 1 (E1)

A resin composition, comprising ingredients as follows:
(A) 100 parts by weight of SA-9000 (polyphenylene ether resin);
(B) 5 parts by weight of BMI-2300 (bismaleimide resin);
(C) 40 parts by weight of Compound B (phosphazene compound having a vinyl group);
(D) 100 parts by weight of fused silica (filler);
(E) 50 parts by weight of toluene (solvent); and
(F) 0.1 part by weight of 25B (curing accelerator).

Embodiment 2 (E2)

A resin composition, comprising ingredients as follows:
(A) 100 parts by weight of BA-230S (cyanate ester resin);
(B) 40 parts by weight of Compound B (phosphazene compound having a vinyl group);
(C) 100 parts by weight of fused silica (filler);
(D) 50 parts by weight of methyl ethyl ketone (solvent); and
(E) 0.02 part by weight of zinc caprylate (curing accelerator).

Embodiment 3 (E3)

A resin composition, comprising ingredients as follows:
(A) 100 parts by weight of BA-3000S (cyanate ester resin);
(B) 35 parts by weight of KI-80 (bismaleimide resin);
(C) 40 parts by weight of Compound B (phosphazene compound having a vinyl group);
(D) 100 parts by weight of fused silica (filler);
(E) 50 parts by weight of methyl ethyl ketone (solvent); and
(F) 0.02 part by weight of zinc caprylate (curing accelerator).

Comparison 1 (C1)

A resin composition, comprising ingredients as follows:
(A) 100 parts by weight of SA-9000 (polyphenylene ether resin);
(B) 5 parts by weight of BMI-2300 (bismaleimide resin);

(C) 40 parts by weight of SPH-100 (phosphazene compound having a hydroxyl group);
(D) 100 parts by weight of fused silica (filler);
(E) 50 parts by weight of toluene (solvent); and
(F) 0.1 part by weight of 25B (curing accelerator).

Comparison 2 (C2)

A resin composition, comprising ingredients as follows:
(A) 100 parts by weight of SA-9000 (polyphenylene ether resin);
(B) 5 parts by weight of BMI-2300 (bismaleimide resin);
(C) 40 parts by weight of SPB-100 (phosphazene compound);
(D) 100 parts by weight of fused silica (filler);
(E) 50 parts by weight of toluene (solvent); and
(F) 0.1 part by weight of 25B (curing accelerator).

Comparison 3 (C3)

A resin composition, comprising ingredients as follows:
(A) 100 parts by weight of BA-3000S (cyanate ester resin);
(B) 35 parts by weight of KI-80 (bismaleimide resin);
(C) 40 parts by weight of SPH-100 (phosphazene compound having a hydroxyl group);
(D) 100 parts by weight of fused silica (filler);
(E) 50 parts by weight of methyl ethyl ketone (solvent); and
(F) 0.02 part by weight of zinc caprylate (curing accelerator).

Comparison 4 (C4)

A resin composition, comprising ingredients as follows:
(A) 100 parts by weight of BA-3000S (cyanate ester resin);
(B) 35 parts by weight of KI-80 (bismaleimide resin);
(C) 40 parts by weight of SPB-100 (phosphazene compound);
(D) 100 parts by weight of fused silica (filler);
(E) 50 parts by weight of methyl ethyl ketone (solvent); and
(F) 0.02 part by weight of zinc caprylate (curing accelerator).

The chemicals for use in the manufacturing Example, embodiments, and comparisons are as follows:
SA-9000: polyphenylene ether resin, purchased from Sabic.
BMI-2300: bismaleimide resin, purchased from Daiwa Fine Chemicals Co., Ltd.
25B: 2,5-dimethyl-2,5-di(t-butylperoxy) hexyne-3, purchased from Nippon Oil & Fats Co., Ltd.
BA-230S: cyanate ester resin, purchased from Lonza.
KI-80: bismaleimide resin, purchased from KI chemical.
BA-3000S: cyanate ester resin, purchased from Lonza.
SPH-100: phosphazene compound having a hydroxyl group, purchased from Otsuka Chemical.
SPB-100: phosphazene compound, purchased from Otsuka Chemical.

Ingredients of the resin composition in embodiments 1 through 3 are enumerated in Table 1. Ingredients of the resin composition in comparisons 1 through 4 are enumerated in Table 2.

The ingredients of the resin composition in embodiments 1 through 3 and comparisons 1 through 4 are evenly mixed in a blender batch by batch before being put into an impregnation tank. Then, a glass fiber fabric is passed through the impregnation tank to allow the resin composition to adhere to the glass fiber fabric before undergoing a heating and baking process to become semi-cured, thereby forming a prepreg.

A piece of 18-μm copper foil, four pieces of the prepreg prepared by the same batch, and another piece of 18-μm copper foil are stacked in sequence before being laminated against each other in vacuum at 210° C. for two hours to form a copper-clad laminate (CCL). The four pieces of prepreg are cured to form an insulating layer between the two copper foils.

A physical properties measurement process is performed on the copper-free laminates of the etched aforesaid copper-clad laminates and copper foils. The physical properties measurement process entails: measuring heat resistance (T288) and the coefficient of thermal expansion (CTE, z-axis, alpha 1: at 50~120 □, with TMA, at ppm/□, wherein low CTE is desirable), performing copper-clad laminate immersion tin test (solder dip, S/D, at 288□, for 10 seconds, to measure heat resistance cycle, S/D), performing immersion tin test (pressure cooking at 121□, for 3 hours, to test solder dip at 288□ for 20 seconds to inspect for board rupture) after the copper-free laminate PCT has undergone water absorption, measuring the peeling strength between the copper foil and the laminate (peeling strength, P/S, half ounce copper foil, where low peeling strength between the copper foil and the laminate is undesirable), measuring dielectric constant Dk (wherein low dielectric constant Dk is desirable), measuring dielectric dissipation factor Df (wherein low dissipation factor Df is desirable), and evaluating flame retardation (by performing a flaming test, UL94, with the ranking: V-0>V-1.) The results of laminate physical properties measurement of the resin composition in embodiments 1, 3 are enumerated in Table 3. The results of laminate physical properties measurement of the resin composition in comparisons 1 through 4 are enumerated in Table 4. Referring to Table 3 and Table 4, an integrated comparison of embodiments 1 through 3 and comparisons 1 through 4 reveals the following: a comparison of the phosphazene compound modified with a vinyl group (embodiments 1 through 3) and the unmodified phosphazene compound (comparisons 2 and 4) proves that the laminate manufactured in comparisons 2 and 4 manifests a significantly high CTE value, low heat resistance, and low peel strength of copper foils; by contrast, a comparison of the phosphazene compound modified with a vinyl group (embodiments 1 through 3) and the phosphazene compound having a hydroxyl group (comparisons 1 and 3) proves that the laminate manufactured in comparisons 1 and 3 manifests a significantly high CTE value, deteriorated flame retardation, poor heat resistance, and obviously unsatisfactory dielectric properties (Dk, Df.)

TABLE 1

| ingredient | | E1 | E2 | E3 |
|---|---|---|---|---|
| polyphenylene ether resin | SA-9000 | 100 | — | — |
| cyanate ester resin | BA-230S | — | 100 | — |
| Cyanate ester resin | BA-3000S | — | — | 100 |
| bismaleimide resin | BMI-2300 | 5 | — | — |
| bismaleimide resin | KI-80 | — | — | 35 |
| phosphazene compound having a vinyl group | Coumpond B | 40 | 40 | 40 |
| inorganic filler | fused silica | 100 | 100 | 100 |
| solvent | toluene | 50 | — | — |
| solvent | methyl ethyl ketone | — | 50 | 50 |
| curing accelerator | 25B | 0.1 | — | — |
| curing accelerator | zinc caprylate | — | 0.02 | 0.02 |

TABLE 2

| ingredient | | C1 | C2 | C3 | C4 |
|---|---|---|---|---|---|
| polyphenylene ether resin | SA-9000 | 100 | 100 | — | — |
| cyanate ester resin | BA-3000S | — | — | 100 | 100 |
| bismaleimide resin | BMI-2300 | 5 | 5 | — | — |
| bismaleimide resin | KI-80 | — | — | 35 | 35 |

TABLE 2-continued

| ingredient | | C1 | C2 | C3 | C4 |
|---|---|---|---|---|---|
| phosphazene compound having a hydroxyl group | SPH-100 | 40 | — | 40 | — |
| phosphazene compound | SPB-100 | — | 40 | — | 40 |
| inorganic filler | fused silica | 100 | 100 | 100 | 100 |
| solvent | toluene | 50 | 50 | — | — |
| solvent | methyl ethyl ketone | — | — | 50 | 50 |
| curing accelerator | 25B | 0.1 | 0.1 | — | — |
| curing accelerator | zinc caprylate | — | — | 0.02 | 0.02 |

TABLE 3

| property test | method | E1 | E2 | E3 |
|---|---|---|---|---|
| T288 | TMA (min) | >60 | >60 | >60 |
| CTE (50~120☐) | ppm/☐ | 54 | 50 | 48 |
| S/D | dip cycles | >20 | >20 | >20 |
| PCT (3 hr) | dip 288☐, 20 s | Pass | Pass | Pass |
| P/S | Hoz Cu foil | 4.1 | 5.3 | 5.5 |
| Dk | 10 GHz | 3.75 | 3.85 | 3.90 |
| Df | 10 GHz | 0.0067 | 0.0091 | 0.0085 |
| flaming test | UL94 | V-0 | V-0 | V-0 |

TABLE 4

| property test | method | C1 | C2 | C3 | C4 |
|---|---|---|---|---|---|
| T288 | TMA (min) | 30 | 45 | 15 | 40 |
| CTE (50~120☐) | ppm/☐ | 67 | 75 | 66 | 77 |
| S/D | dip cycles | 15 | >20 | 11 | 18 |
| PCT (3 hr) | dip 288☐, 20 s | NG | Pass | NG | Pass |
| P/S | Hoz Cu foil | 3.80 | 3.86 | 4.9 | 4.8 |
| Dk | 10 GHz | 3.89 | 3.78 | 3.97 | 3.92 |
| Df | 10 GHz | 0.0085 | 0.0069 | 0.011 | 0.0087 |
| Flame test | UL94 | V-1 | V-0 | V-1 | V-0 |

Comparison 1: use the phosphazene compound having a hydroxyl group, thereby deteriorating laminate heat resistance (T288, PCT, S/D); due to its hydroxyl group, the phosphazene compound having a hydroxyl group features a significant increase (i.e., deterioration) in the dielectric dissipation factor (Df), with flame retardation of V-1, and overly large CTE.

Comparison 2: use the phosphazene compound, which lacks any reactive functional group, thereby resulting in overly high CTE value; by contrast, in embodiment 2, the phosphazene compound having a vinyl group (with carbon-carbon double bond) reacts with another resin and thus has a low CTE value.

Comparison 3: use the phosphazene compound having a hydroxyl group, thereby deteriorating the heat resistance, dielectric properties, and flame retardation of the resin composition, and ending up with an overly high CTE value.

Comparison 4: use the phosphazene compound, thereby deteriorating the heat resistance and dielectric properties of the resin composition, with an overly high CTE value.

Hence, the present invention meets the three requirements of patentability, namely novelty, non-obviousness, and industrial applicability. Regarding novelty and non-obviousness, the present invention discloses a phosphazene compound having a vinyl group, a prepreg manufactured therefrom, or a resin film manufactured therefrom, so as to be applicable to copper-clad laminates and printed circuit boards, to thereby achieve a low coefficient of thermal expansion, low dielectric properties, and be heat resistant, fire resistant and halogen-free. Regarding industrial applicability, products derived from the present invention meet market demands fully.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A phosphazene compound having a vinyl group, with the phosphazene compound being of a structure expressed by formula (II) below:

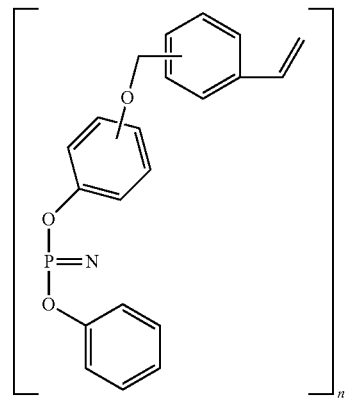

formula (II), wherein the structure of formula (II) is cyclic and n denotes an integer from 3 to 6.

2. The phosphazene compound of claim 1, being of a structure expressed by formula (III) below:

formula (III)

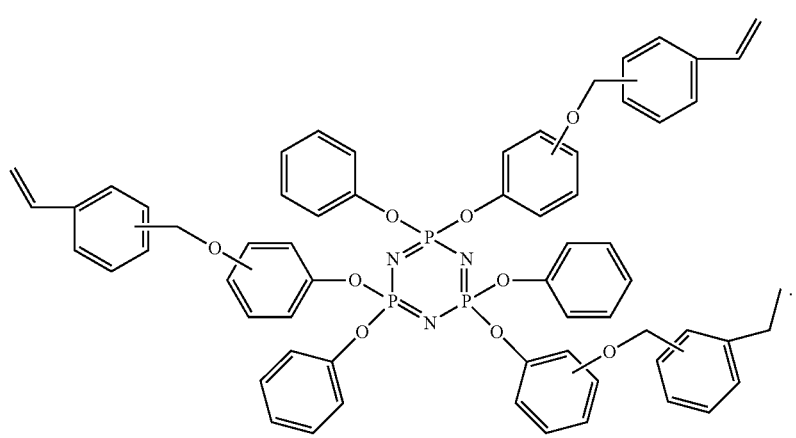

3. A resin composition comprising the phosphazene compound of claim 2.

4. The resin composition of claim 3, further comprising at least one component selected from the group consisting of epoxy resin, phenol resin, isocyanate ester resin, cyanate ester resin, benzoxazine resin, styrene-maleic anhydride (SMA), polyester, maleimide, polyphenylene ether resin, dicyandiamide, diaminodiphenylsulfone, styrene, polybutadiene, polyamide, polyimide, olefin, a curing accelerator, an inorganic filler, a solvent, a toughening agent, and a silane coupling agent.

5. A resin film made from the resin composition of claim 3.

6. A prepreg made from the resin composition of claim 3.

7. A copper-clad laminate made from the prepreg of claim 6.

8. A printed circuit board comprising the copper-clad laminate of claim 7.

9. A method for manufacturing a phosphazene compound having a vinyl group, characterized in that the phosphazene compound having a vinyl group is manufactured by a reaction between a vinyl compound and a phosphazene compound having a hydroxyl group, wherein the vinyl compound is selected from the group consisting of 4-chloro-methyl styrene, 3-chloro-methyl styrene, and 2-chloro-methyl styrene.

10. A method for manufacturing a phosphazene compound having a vinyl group, characterized in that the phosphazene compound having a vinyl group is manufactured by a reaction between a vinyl compound and a phosphazene compound having a hydroxyl group, wherein the reaction takes place in the presence of sodium hydroxide and tetrabutylammonium iodide.

* * * * *

UNITED STATES PATENT AND TRADEMARK OFFICE
CERTIFICATE OF CORRECTION

PATENT NO.        : 9,000,077 B2
APPLICATION NO.   : 13/921447
DATED             : July 7, 2015
INVENTOR(S)       : Chen-Yu Hsieh Page 1 of 1

It is certified that error appears in the above-identified patent and that said Letters Patent is hereby corrected as shown below:

Formula (II) of claim 1 in column 14 should read

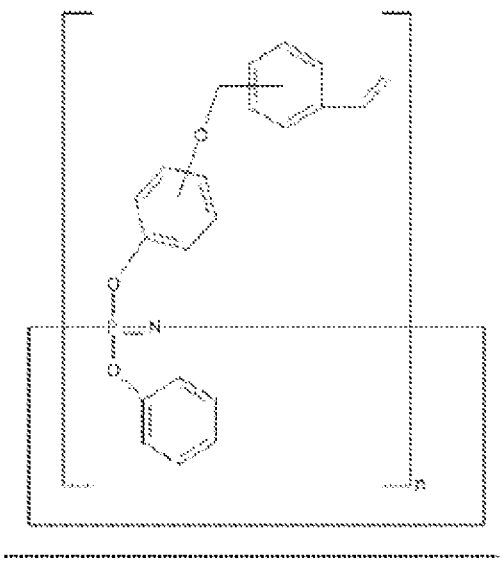

Signed and Sealed this
Twenty-seventh Day of October, 2015

Michelle K. Lee
*Director of the United States Patent and Trademark Office*